United States Patent
Zhang et al.

(10) Patent No.: US 9,365,428 B2
(45) Date of Patent: Jun. 14, 2016

(54) GRAPHENE NANORIBBONS AND METHODS

(71) Applicant: Florida State University Research Foundation, Inc., Tallahassee, FL (US)

(72) Inventors: Mei Zhang, Tallahassee, FL (US); Okenwa O. I. Okoli, Tallahassee, FL (US); Hai Hoang Van, Tallahassee, FL (US)

(73) Assignee: FLORIDA STATE UNIVERSITY RESEARCH FOUNDATION, INC., Tallahassee, FL (US)

( * ) Notice: Subject to any disclaimer, the term of this patent is extended or adjusted under 35 U.S.C. 154(b) by 207 days.

(21) Appl. No.: 14/329,926

(22) Filed: Jul. 12, 2014

(65) Prior Publication Data

US 2015/0013896 A1    Jan. 15, 2015

Related U.S. Application Data

(60) Provisional application No. 61/845,436, filed on Jul. 12, 2013.

(51) Int. Cl.
*C01B 31/04*    (2006.01)
*C01B 31/02*    (2006.01)

(52) U.S. Cl.
CPC .......... *C01B 31/0446* (2013.01); *C01B 31/0253* (2013.01); *C01B 2202/08* (2013.01); *C01B 2204/06* (2013.01)

(58) Field of Classification Search
CPC ..................... C01B 31/0446; C01B 31/0253
See application file for complete search history.

(56) References Cited

U.S. PATENT DOCUMENTS

| | | | |
|---|---|---|---|
| 2010/0105834 A1* | 4/2010 | Tour | B82Y 30/00 525/50 |
| 2011/0097258 A1* | 4/2011 | Lee | B82Y 30/00 423/448 |

* cited by examiner

*Primary Examiner* — Daniel McNally
(74) *Attorney, Agent, or Firm* — Sutherland Asbill & Brennan LLP

(57) ABSTRACT

Methods are provided for fabricating graphene nanoribbons. The methods rely on laser irradiation that is applied to a carbon nanotube film to unzip one or more carbon nanotubes of the carbon nanotube film. Graphene nanoribbons can be cross-linked via laser irradiation to form a graphene nanoribbon network.

16 Claims, 4 Drawing Sheets

GRAPHENE NANORIBBONS AND METHODS

CROSS-REFERENCE TO RELATED APPLICATIONS

This application claims priority to U.S. Provisional Patent Application No. 61/845,436, filed Jul. 12, 2013, which is incorporated herein by reference.

BACKGROUND

Graphene nanoribbons (GNRs) are basically long thin graphene strips. Due to their small dimensions and active electronic edge states, GNRs can exhibit finite (nonzero) band gap values, which can be tuned depending on their geometric features. Theory predicts and experiment confirms that the band gap in GNRs is inversely proportional to their width. Namely, GNRs may retain graphene's high carrier mobility while presenting a finite band gap.

These properties can make GNRs very valuable materials for the building of an assortment of nanodevices. GNRs can also be cross-linked or welded, i.e., joined, together to form a large-scale GNR network, which can be used as flexible, stretchable, and/or transparent electrodes for electronic and photonic devices.

Generally, compared with carbon nanotube (CNT) sheets, GNR networks may have higher transparency, lower resistance, and/or better adhesion with other materials.

To date, several methods have been developed for the synthesis of GNRs, including lithographical patterning of graphene, bottom-up organic synthesis, sonochemical cutting of exfoliated expandable graphite, chemical vapor deposition, oxygen plasma etching of graphene using nanowires as a physical protection mask, Li intercalation followed by exfoliation, and longitudinal unzipping of multi-walled CNTs.

Since CNTs are cylindrical shells that can be made, at least in concept, by rolling graphene sheets into a seamless cylinder, the unzipping of CNTs is a new and very promising approach for controlled and large-scale GNR production. In this process, CNTs are unzipped (opened or fractured) along their longitudinal axes in such a way that the obtained structures are the desired GNRs.

Unzipping CNTs has been practiced in many different ways using a variety of chemical and physical methods. However, these chemical and physical methods typically use strong acids, oxidizing agents, or other solvents. The wet-processes often alter the properties of GNRs for various reasons, including the high proportion of oxygen functionalities or particles that may contact the CNTs or GNRs. The alteration of the GNRs' properties can cause problems in device fabrication processes, because the alterations may lead to wrinkles and/or the folding of GNRs. The alterations may make it difficult to position the GNRs as desired.

Nevertheless, another advantage of using CNTs as starting materials to produce GNRs is the fact that the existing knowledge of CNT synthesis and purification methods can be used to control and/or optimize GNR fabrication.

Therefore, a way to produce GNRs from CNT starting materials that overcomes one or more of the difficulties associated with the known methods is desirable.

BRIEF SUMMARY

Methods are provided for fabricating graphene nanoribbons comprising applying laser irradiation to a carbon nanotube film to unzip one or more carbon nanotubes of the carbon nanotube film. In embodiments, the carbon nanotube film comprises one sheet of carbon nanotubes. In particular embodiments, the methods include stacking two or more sheets of carbon nanotubes to fabricate the carbon nanotube film. In some embodiments, the sheet(s) of carbon nanotubes are formed by pulling carbon nanotubes out of a drawable carbon nanotube forest to form the sheet(s) of carbon nanotubes. In further embodiments, graphene nanoribbons are cross-linked via laser irradiation to form a graphene nanoribbon network.

BRIEF DESCRIPTION OF THE DRAWINGS

FIG. 4E is a part of FIG. 4D.

DETAILED DESCRIPTION

Methods are provided for fabricating graphene nanoribbons (GNRs) or GNR networks by unzipping carbon nanotubes (CNTs) in a CNT film using laser irradiation. The methods provide a novel solid-state process to fabricate freestanding GNRs and GNR networks. In embodiments, the GNRs and GNR networks are freestanding.

Typically, freestanding CNT sheets can be used as the starting material. The methods generally rely on controlled laser irradiation in a preferred environment to convert CNTs to GNRs, and the GNRs may be cross-linked together to form a GNR network. The conversion of CNTs to GNRs occurs by unzipping the CNTs. As used herein, the terms "unzip" or "unzipping" generally refer to opening or fracturing the structure of the CNTs with laser irradiation to form GNRs. As used herein, the terms "cross-link" or "cross-linked" generally refer to the joining together of two portions of a GNR or two GNRs with laser irradiation. Not wishing to be bound by any particular theory, it is believed that cross-linking GNRs together to form a GNR network may further lower the sheet resistance and increase the strength of the GNR network. The unzipping and cross-linking may occur simultaneously or sequentially. In particular embodiments, the GNR networks are transferred to a substrate.

Generally, the methods described herein are solid-state fabrication processes, which do not use any acids or solvents. In embodiments, the processes yield long, pure, and freestanding GNRs. Unlike some of the previously known processes, the processes provided herein are capable of fabricating large, freestanding GNRs and GNR networks, and creating controllable CNT-graphene intramolecular junctions.

Freestanding GNR networks, in embodiments, comprise transparent conductive layers. These transparent conductive layers, in some embodiments, can be transferred easily onto any kind of substrate. After transferring the GNR networks to a substrate, the resulting material may serve as a transparent electrode for various electronic and photonic applications. A number of applications can benefit from the methods provided herein because the solid-state processes are generally fast, clean, and/or scalable, and can be developed or used as part of a large-scale nanomanufacturing process.

CNT Sheets and CNT Films

Figure 1:
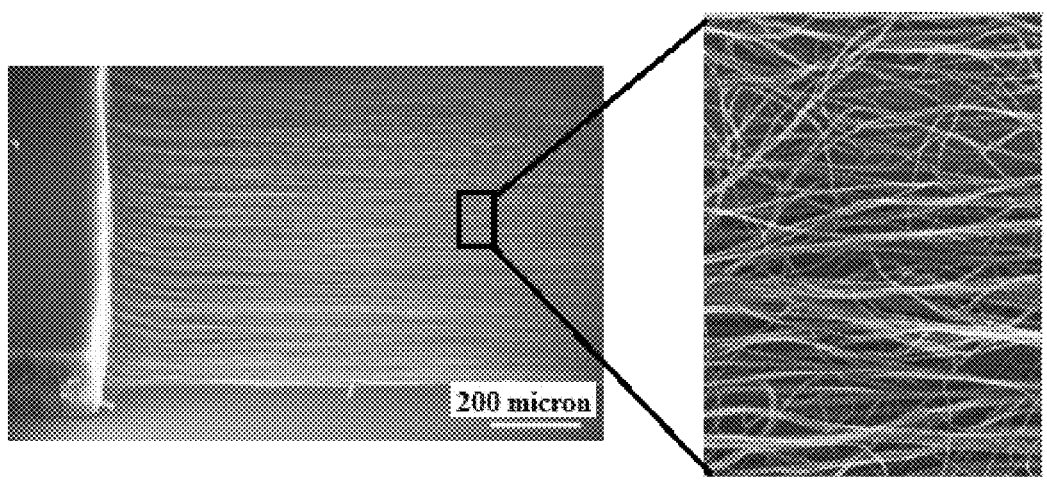
FIG. 1 is a scanning electron microscope (SEM) image (taken at a 35° angle with respect to the forest plane) that captures a CNT forest being drawn into a sheet (left). The higher magnification image shows the topology of the sheet (right).

In embodiments, the methods provided herein use a freestanding CNT film as a starting material. The CNTs in the film are then unzipped by laser irradiation to form GNRs. Generally, the CNT films are a special assembly of CNTs. In some embodiments, the CNT film comprises one CNT sheet. In other embodiments, the CNT film comprises two or more CNT sheets. The two or more CNT sheets may be stacked as described herein. The two or more sheets, in particular embodiments, are stacked and densified in the thickness direction. The sheets may be densified by using solvent evaporation to form a densely packed CNT film. CNT sheets can be made by directly pulling CNTs out of the side of a drawable CNT forest, in which CNTs may form a unique network. The drawable CNT forests may be made by a method that employs chemical vapor deposition (CVD). The CNTs can be single-walled, multi-walled CNTs, or a combination thereof. CNTs in the sheets, in some embodiments, are substantially aligned along the drawing direction, as shown in FIG. 1. FIG. 1 is a scanning electron microscope (SEM) image that captures a CNT forest being drawn into a sheet (left). The higher magnification portion of FIG. 1 shows the topology of the sheet (right). Even when the CNTs of a sheet are substantially aligned, the sheet may include small bundles formed by one or more CNTs. A CNT sheet may be an aerogel, i.e., a CNT network with high porosity.

In embodiments, two or more CNT sheets of substantially aligned CNTs may be stacked so that the CNTs of each sheet are oriented in the same direction. The orientation direction of a particular CNT sheet is the direction of CNT alignment, which is usually determined by the sheet draw direction. The offset of the orientation direction of two adjacent CNT sheets may range from 0 to ±90 degrees. In particular embodiments, the offset of the orientation direction of two adjacent CNT sheets ranges from 0 to about ±10 degrees. In some embodiments, two adjacent CNT sheets are stacked with about a 5 degree offset in orientation direction, which may prevent the formation of some or all CNT bundles when the sheets are densified.

In embodiments, the CNT sheets have a density of about 1.5 mg/cm$^3$, an areal density in the sheet plane of from about 1 to about 3 μg/cm$^2$, and a thickness of about 20 μm. In some embodiments, the CNT sheets have a density of from about 0.5 mg/cm$^3$ to about 2.5 mg/cm$^3$. In other embodiments, the CNT sheets have an areal density in the sheet plan of from about 0.5 to about 5.0 μg/cm$^2$. In further embodiments, the CNT sheets have a thickness of from about 10 μm to about 30 μm. In certain embodiments, liquid-based densification of an aerogel sheet can decrease sheet thickness by about 400-fold, usually to about 50 nm.

In embodiments, the CNT sheets have a specific strength (i.e., strength normalized by density) of up to 144 MPa cm$^3$/g. In some embodiments, the CNT sheets have a specific strength of from about 50 to 144 MPa cm$^3$/g. In other embodiments, the CNT sheets have a specific strength of from about 100 to about 144 MPa cm$^3$/g. In further embodiments, the CNT sheet have a specific strength of from about 125 to about 144 MPa cm$^3$/g.

Generally, CNT sheets with any desired dimensions can be made using techniques known to those of skill in the art, and employed in the methods provided herein. The CNT sheets can have essentially unlimited lengths and widths. Typically, a CNT forest with dimensions of 20 cm×12 cm×400 μm can be transformed into a CNT sheet that is up to 20 cm wide and more than a hundred meters long.

In some embodiments, a CNT film is made by stacking or associating two or more CNT sheets. The number and type of CNT sheets can be selected to form a CNT film having certain characteristics. For example, the porosity of a CNT film can be adjusted as desired. Typically, the porosity of a CNT film decreases as the number of CNT sheets used to form the CNT film increases, especially when the CNT sheets are densified.

The densification can be performed by wetting and then drying the stacked CNT sheets. Wetting CNTs can be done by any suitable technique. For example, the wetting may be done either by spraying solvent or directly immersing the stacked sheets in solvent. Any solvents that can wet CNTs (hydrophilic to CNT surface), such as isopropanol (IPA), ethanol, acetone, and methanol, can be utilized for this purpose. Generally, the evaporation rate of the solvent can influence the uniformity of the CNT film. Therefore, the evaporation rate may be an important consideration.

In embodiments, the thickness of CNT films is from about 50 nm to about 500 nm. In some embodiments, the thickness of the CNT films is from about 50 nm to about 250 nm. In particular embodiments, the CNTs in the film are substantially aligned.

Laser Irradiation

Generally, the laser irradiation process is a fast, untouched, and clean process. Typically, when a laser beam is absorbed by a material, energy is first converted to electronic excitation and then into thermal, chemical, and mechanical energy, which may result in structural modification, evaporation, ablation, plasma formation, and/or exfoliation depending on the interaction between laser and materials.

By controlling the process parameters according to the methods described herein, the laser technology can be used not only for unzipping CNTs to form GNRs, but also for cross-linking the GNRs to form GNR networks, and modifying the structures of the GNR networks.

In the methods provided herein, laser irradiation is used to unzip CNTs to form GNRs and/or GNR networks. In embodiments, the lasers for unzipping CNTs operate in continuous wave state. In other embodiments, the lasers for unzipping the CNTs operate in pulsed state.

In embodiments, the laser wavelength is in the range of from about 180 nm to about 11,000 nm. In certain embodiments, the power of the laser is from about 0.1 W to about 5 W. In certain embodiments, the combination of laser scanning speed, focusing position, and the irradiation time for processing can be determined by the energy density on the CNT film.

In embodiments, irradiation at a position on a CNT film occurs on a timescale ranging from fs and ms. Generally, the laser irradiation applied to a CNT film can be applied in different shapes. In one embodiment, the shape is a laser spot. In other embodiments, the shape is a laser line. In some embodiments, the laser irradiation is performed in a controlled environment, under a selected pressure and/or gas. The gas that is selected may be any suitable gas that does not interfere with the method, including air, inert gas, and/or reaction gas. The process pressure may range from high vacuum to atmospheric pressure. In certain embodiments, the laser irradiation is performed in or under one or more gasses at desired flow rates, such as air, Ar, $N_2$, or a combination thereof.

Generally, the scanning direction of the laser irradiation is substantially along, substantially perpendicular to, or substantially at a specific angle relative to the CNT longitudinal axis. The methods provided herein can generate GNRs that are single layered or multilayered. In embodiments, the number of layers is from 1 to 4. In other embodiments, the number of layers is from 1 to 3. In further embodiments, the number of layers is 1. In embodiments, the GNRs have a length of from about 10 μm to about 100 μm.

In embodiments, the unzipping, cross-linking, and structural modifications can be done separately and the laser scan can be performed multiple times to achieve a desired structure. For example, in some embodiments, the scan can first be conducted perpendicularly to the CNT axial direction with high energy density and a step of a hundred micrometers, and then along the CNT axial direction using a lower energy density with steps smaller than the laser beam size to achieve a high unzipping rate. Therefore, in these embodiments, the first step creates defects in the CNTs and the second step guides the development of the defects to realize the unzipping of CNTs.

The processes provided herein also may be scaled up for industrial implementation. Industrial scale equipment can be used to perform each step of the process. Laser processing typically is fast, green, and can be easily implemented in large-scale manufacturing processes.

The size of a GNR network that can be made according to the methods provided herein may be related to the size of the CNT forest, and the size of the forest usually is determined by the size of the reaction chamber. For example, if a CVD system with a reaction chamber of 5" in diameter is used, a 12 cm×20 cm drawable forest can be synthesized. Such a forest can be used to produce a GNR network up to 20 cm wide and more than 100 m long with a speed of more than 10 m/min. This throughput is much higher than synthesizing graphene on metal substrates for making transparent conductive electrodes.

EXAMPLES

The following specific examples are provided for illustration of the preferred embodiments of the present invention and should not be considered limiting on the scope of the invention.

Example 1

Prepare CNT Film and Laser Irradiation

Figure 2:
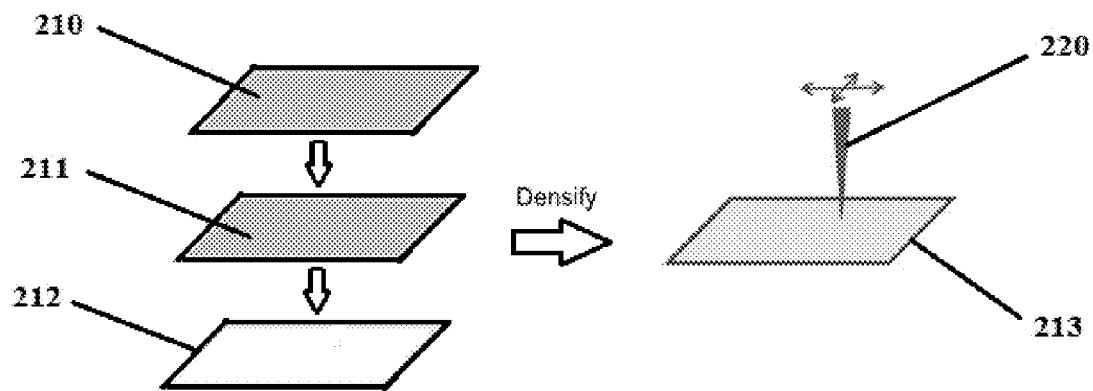
FIG. 2 is a schematic illustration of stacking two layers of CNT sheets on a frame, and the laser irradiation of the densified freestanding CNT film.

A schematic illustration of preparing a CNT film and the laser irradiation process, according to one embodiment, is shown at FIG. 2. Two freestanding CNT sheets (210, 211) of substantially aligned CNTs were transferred to a frame 212, densified, and the framed sheets 213 were irradiated by a laser 220. In FIG. 2, the two CNT sheets (210, 211) were stacked so that the substantially aligned CNTs of each sheet were oriented in the same direction. In other embodiments, however, two or more CNT sheets can be stacked together so that the substantially aligned CNTs of each sheet have different orientations relative to each other.

Figure 3:
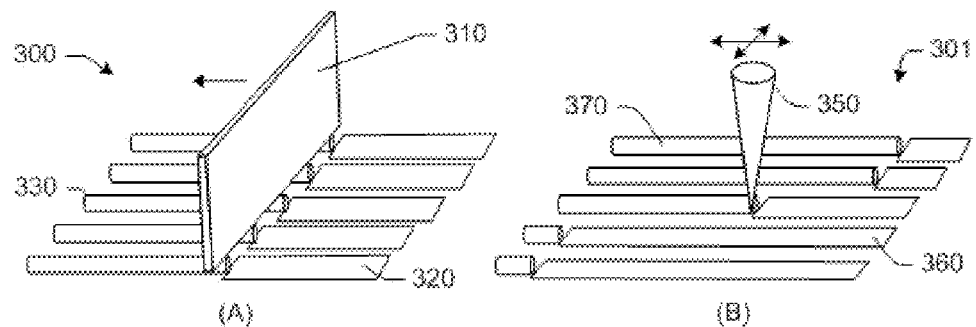
FIGS. 3A and 3B are schematic illustrations of the unzipping of CNTs by laser line (FIG. 3A) and laser spot (FIG. 3B).

FIG. 3 includes schematic illustrations (300, 301) of the laser irradiation of a CNT film according to one embodiment. The scanning pattern is related to the shape of the laser. FIGS. 3A and 3B show the scan using a laser line 310 and laser spot 350, respectively. The parameters of the scan, such as the scan direction, can be varied depending on the shape of the laser. In FIG. 3A, GNRs 320 are created as the laser line 310 is scanned in the direction of the arrow and towards the CNTs 330. In FIG. 3B, GNRs 360 form wherever the laser spot 350 contacts the CNTs 370.

Example 2

Unzipping CNTs by $CO_2$ Laser to Form GNRs and GNR Network

Figure 4:
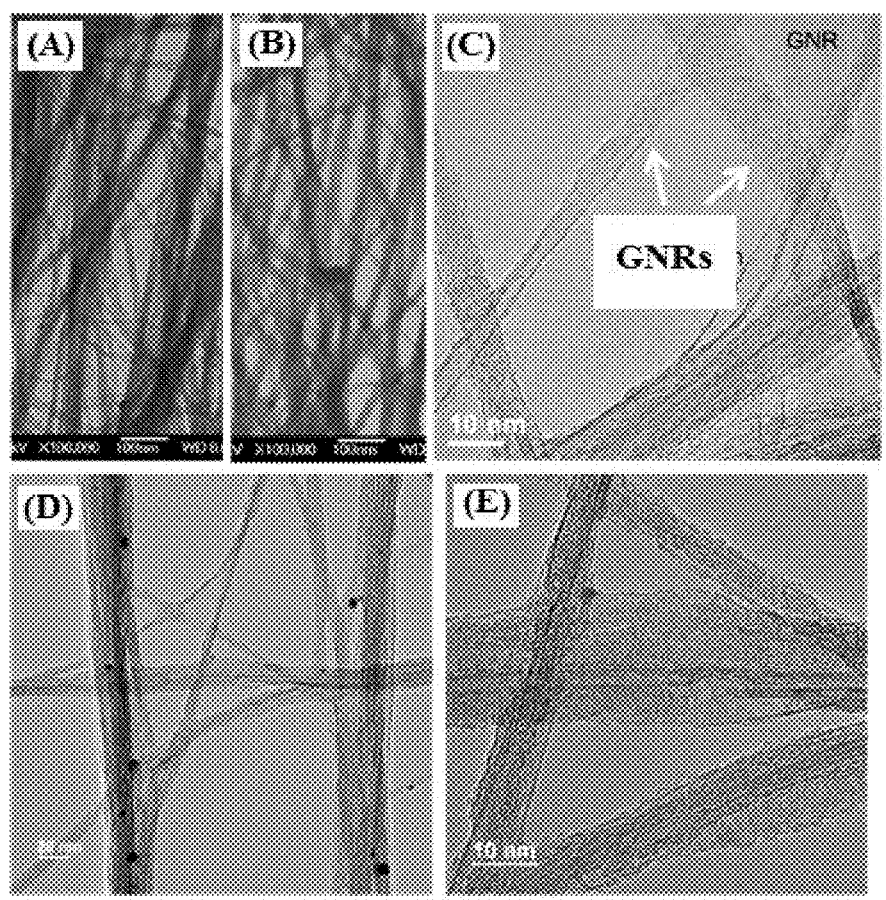
FIGS. 4A-E include TEM images that demonstrate the unzipping of CNTs into GNRs by laser irradiation. The images show the CNTs before laser irradiation (FIG. 4A), the GNRs after laser unzipping of CNTs (FIG. 4B), and after further laser irradiation (FIGS. 4C-4E).

FIG. 4 shows the high-resolution transmission electron microscopy (TEM) images of the CNT film and the GNRs formed by laser unzipping CNTs in one embodiment. The CNT film was formed by stacking 4 layers of CNT sheets on a frame with ±5 degree offset in orientation, and then densifying the layers by immersing in isopropanol (IPA) and drying in air.

A standard, computer controlled laser instrument was used. The laser was a CW $CO_2$ laser with 10.6 μm wavelength and 0.5 W power. The diameter of the focused laser spot on CNT film was 80 μm. The laser was perpendicularly applied to the surface of the CNT film and swept on the suspended CNT film. The power density of the laser was 9.9 kW/cm$^2$. The line density of the beam spot was set at 150 points/cm, and the laser irradiation was performed in air with the scan speed of 15 cm/s.

FIGS. 4A and 4B show the TEM images of the CNTs before and after laser irradiation, respectively. The wall of the CNTs can be clearly distinguished, indicating a tubular structure (FIG. 4A) before the laser irradiation was applied. The laser irradiation unzipped most of the CNTs and converted them into GNRs as shown in FIG. 4B. The GNRs demonstrated distinct topographic characteristics, including a ribbon-like structure with relatively smooth edges.

The high magnification TEM images of FIGS. 4C-4E clearly show that CNTs in the sheet were converted into ribbons under laser irradiation. FIG. 4E shows that CNTs in a small CNT bundle were unzipped and joined together to form large size GNRs. Therefore, contacted CNTs can be unzipped and cross-linked to form GNR networks. Although there were some small graphene features on the surface, these can be removed by further laser treatment. This experiment demonstrated that laser irradiation is a novel and promising way to unzip CNTs and to fabricate freestanding GNRs and GNR networks.

Example 3

Large-Scale Manufacturing Process

Some of the processes described herein are batch processes, but, in embodiments, the processes can be operated in a continuous fashion or be developed into roll-to-roll processes.

Figure 5:
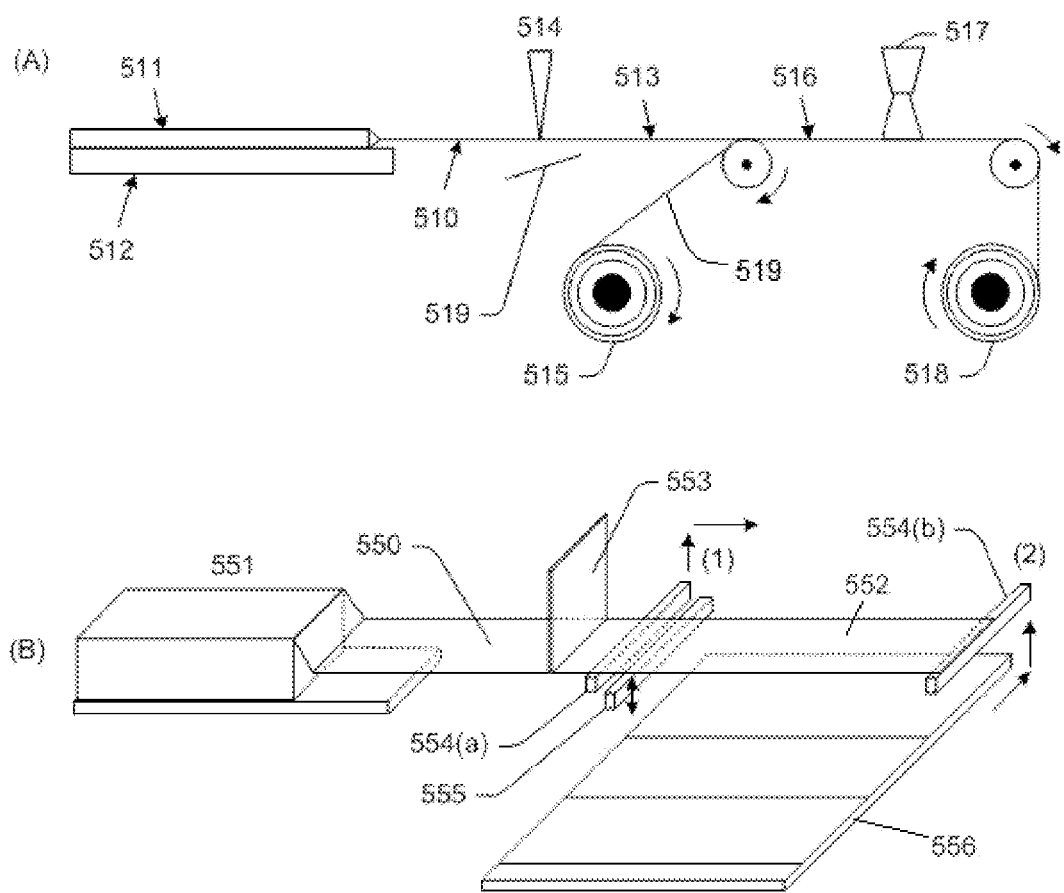
FIGS. 5A and 5B include schematic illustrations of the continuous process for fabricating a GNR coated material (FIG. 5A), and a schematic illustration of the process for making a larger GNR coated material (FIG. 5B).

A continuous process is illustrated in FIG. 5A. The freestanding CNT sheet 510 is formed by drawing CNTs from a CNT forest 511 grown on a substrate 512, the CNT sheet 510 is converted into a GNR network 513 by spot laser irradiation 514 to unzip the CNTs, then the GNR network 513 is transferred to a flexible film 519 drawn from a film roll 515 to produce a GNR network on a film 516. A reflector 519 is positioned under the laser irradiation 514. Adhesion to the film is then reinforced by the capillary force introduced during the drying of the sprayed solvent 517 or further laser treatment (not shown). The GNR network on a film 516 is then be collected on a roll 518.

FIG. 5B illustrates a process for making large size electrode. The CNT sheet 550 drawn from a CNT forest 551 is converted into a GNR network 552 by line laser irradiation 553. When the carrier bar 554 moves from position (1) 554(*a*) towards position (2) 554(*b*), it pulls the GNR network 552 so that the CNT sheet 550 is drawn from the forest and irradiated by the laser 553 continuously, which results in the unzipping of CNTs in the sheet 550 and the formation of GNR networks 552. After the carrier bar 554 reaches position (2) 554(*b*), the holding bar 555 rises and the GNR network 552 is transferred to the transparent substrate 556. This process can be used to transfer a GNR network onto other materials without size limit. In both processes, the laser irradiation can combine different lasers, laser shapes, and/or scan patterns.

We claim:

1. A method for fabricating graphene nanoribbons comprising:
    applying laser irradiation to a carbon nanotube film to unzip one or more carbon nanotubes of the carbon nanotube film to create one or more graphene nanoribbons.

2. The method of claim 1, wherein the method further comprises:
    stacking two or more sheets of carbon nanotubes to fabricate the carbon nanotube film.

3. The method of claim 2, wherein the method further comprises:
    pulling a drawable carbon nanotube forest to form the two or more sheets of carbon nanotubes.

4. The method of claim 2, wherein the two or more sheets of carbon nanotubes comprise substantially aligned carbon nanotubes, and the two or more sheets of carbon nanotubes are stacked with about a 5 degree offset in orientation direction.

5. The method of claim 2, wherein the two or more sheets of carbon nanotubes are densified.

6. The method of claim 1, wherein the method further comprises:
    cross-linking the one or more graphene nanoribbons to form a graphene nanoribbon network.

7. The method of claim 6, wherein the method further comprises:
    transferring the graphene nanoribbon network to a substrate.

8. The method of claim 1, wherein the carbon nanotube film comprises one sheet of carbon nanotubes.

9. The method of claim 1, wherein the thickness of the CNT film is from about 50 nm to about 250 nm.

10. The method of claim 1, wherein the laser irradiation is applied with a laser operating in continuous wave state.

11. The method of claim 1, wherein the laser irradiation is applied with a laser operating in pulsed state.

12. The method of claim 1, wherein the laser irradiation is applied in a scanning direction substantially along the longitudinal axis of the one or more carbon nanotubes of the carbon nanotube film.

13. The method of claim 1, wherein the graphene nanoribbons are multi-layered.

14. The method of claim 1, wherein the graphene nanoribbons are single layered.

15. The method of claim 1, wherein the one or more carbon nanotubes of the carbon nanotube film are single-walled nanotubes, multi-walled nanotubes, or a combination thereof.

16. A method for fabricating graphene nanoribbons comprising:
    applying laser irradiation to a carbon nanotube film to unzip one or more carbon nanotubes of the carbon nanotube film to create one or more graphene nanoribbons, and
    cross-linking the one or more graphene nanoribbons to form a graphene nanoribbon network, wherein the carbon nanotube film is densified and comprises two or more sheets of substantially aligned carbon nanotubes that are stacked with about a 5 degree offset in orientation direction.

* * * * *